United States Patent [19]

Paynter

[11] 4,108,050

[45] Aug. 22, 1978

[54] FLUID-DRIVEN TORSIONAL OPERATORS FOR TURNING ROTARY VALVES AND THE LIKE

[76] Inventor: Henry M. Paynter, 35 Scotland Rd., Reading, Mass. 01867

[21] Appl. No.: 686,740

[22] Filed: May 17, 1976

Related U.S. Application Data

[63] Continuation of Ser. No. 497,280, Aug. 14, 1974, abandoned.

[51] Int. Cl.² .............................................. F01B 19/04
[52] U.S. Cl. ........................................ 92/48; 92/13.2; 92/71; 92/92; 92/132; 251/59; 251/61.2
[58] Field of Search .................... 92/34, 40, 89, 90, 91, 92/92, 94, 120, 13.2, 13.6, 130 R, 48, 64, 71, 132; 251/58, 59, 61, 61.2

[56] References Cited

U.S. PATENT DOCUMENTS

| | | | |
|---|---|---|---|
| 2,642,091 | 6/1953 | Morin | 92/90 |
| 3,066,853 | 12/1962 | Landenberger | 92/90 |
| 3,450,382 | 6/1969 | Calim | 92/31 |
| 3,490,733 | 1/1970 | Berthaud | 92/92 |
| 3,613,455 | 10/1971 | Hightower | 92/92 |
| 3,638,536 | 2/1972 | Kleinwachter | 92/92 |
| 3,645,173 | 2/1972 | Yarlott | 92/92 |
| 3,946,641 | 3/1976 | Hirmann | 92/92 |
| 3,977,648 | 8/1976 | Sigmon | 251/59 |

Primary Examiner—Martin P. Schwadron
Assistant Examiner—Abraham Hershkovitz
Attorney, Agent, or Firm—Parmelee, Johnson, Bollinger & Bramblett

[57] ABSTRACT

Fluid-driven torsional operators for turning rotary valves such as ball valves, butterfly valves and the like and for turning similar devices which swing about a pivot axis, said torsional operators including an inflatable fluid-driven torsional actuator having an axially elongated, flexible, hollow, thin-walled elastic shell defining a fluid chamber with a plurality of inextensible flexible strands bonded to this thin-walled shell. These strands extend between the shell ends and are anchored to axially opposed coupling members which are fixed to and in fluid-tight sealing engagement with the opposite ends of the shell. When the torsional actuator is deflated, its flexible shell and the strands bonded thereto are helically twisted or coiled through a predetermined initial angle, and when the chamber within the shell is inflated the shell expands, causing the strands to bow outwardly along arcuate paths and the shell to uncoil, thereby relatively rotating the axially opposed coupling members for turning the valve or other device connected to the coupling members. The predetermined angle through which the shell and strands are initially twisted when the shell is deflated may be selected in accordance with the requirements of the device being turned by the operator embodying the present invention.

The opposed coupling members are mounted for relative rotation in a housing which holds these coupling members and establishes the axial distance between them. Further, a coil spring or another actuator, is provided to urge the shell and strands to helically coil into their initial position and thus to reverse the relative rotation of the coupling members, that is, to turn them back toward their starting position when the actuator is deflated.

5 Claims, 9 Drawing Figures

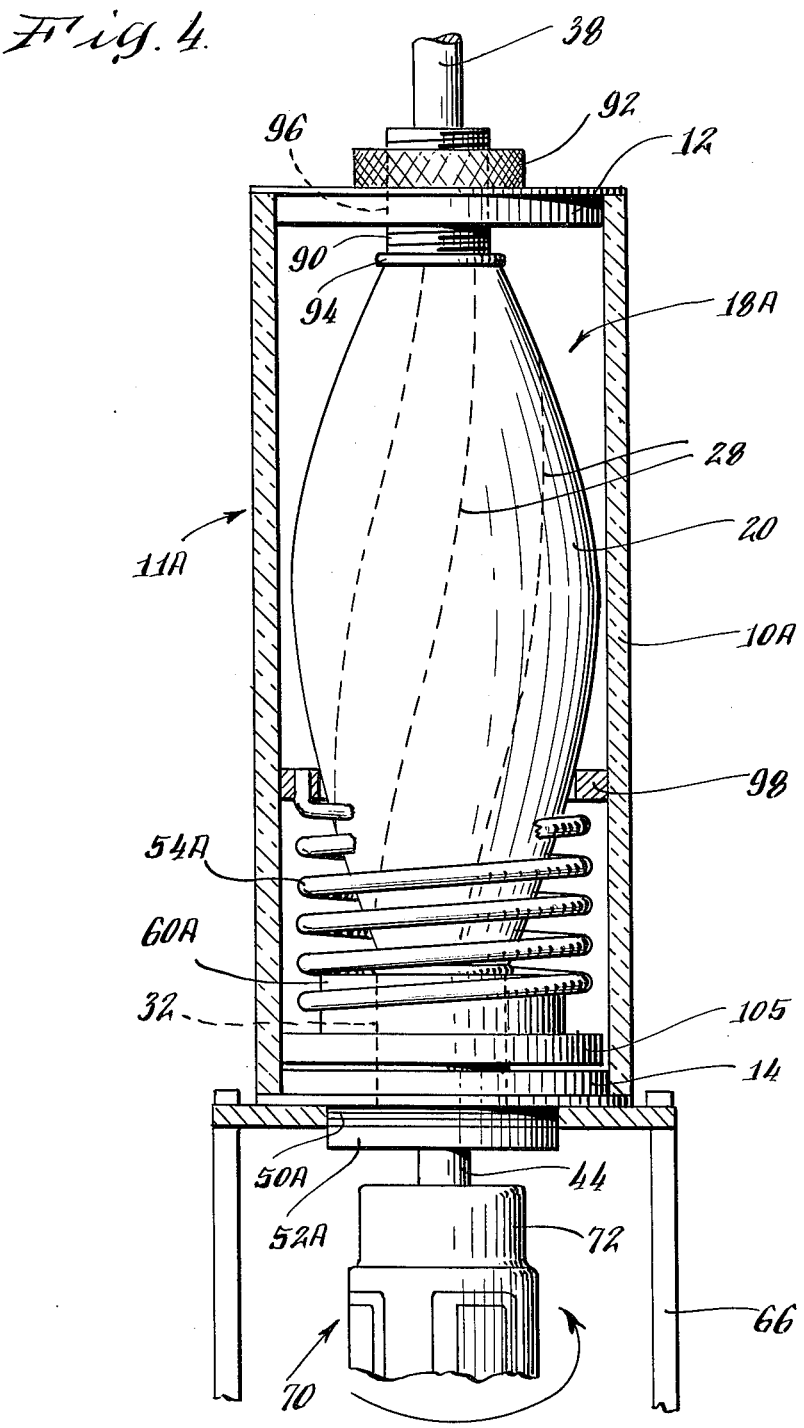

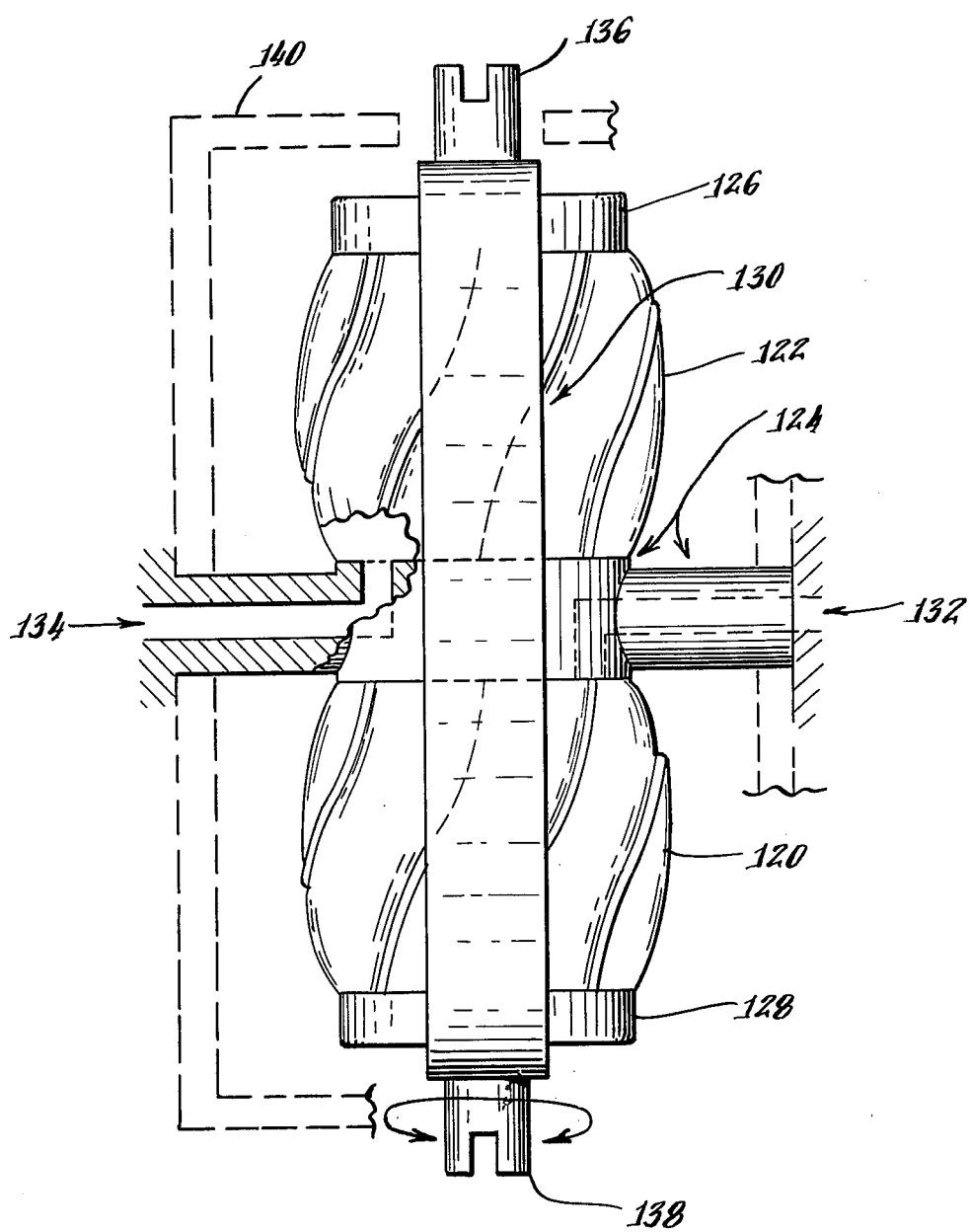

FLUID-DRIVEN TORSIONAL OPERATORS FOR TURNING ROTARY VALVES AND THE LIKE

This is a continuation of copending application Ser. No. 497,280, filed Aug. 14, 1974, now abandoned.

BACKGROUND OF THE INVENTION

1. Field of the Invention

The invention relates to fluid-driven torsional operators for turning rotary valves such as butterfly valves, ball valves or the like and for turning other similar devices which include a member that pivots about an axis such as, for example, circuit breakers, tilt mechanisms, and control mechanisms.

The fluid-driven torsional operators embodying the present invention are particularly advantageous for effecting rotary actuation in the angular range from 0° to 100°. If desired, however, these operators can also be used to effect rotary actuation of a greater amount.

The fluid-driven torsional operators which embody the present invention are energized by pressurized fluid which may be compressed air or other gas or vapor or mixture of gases or may be pressurized water or other liquid or mixture of liquids. Thus, such gases as compressed carbon dioxide, nitrogen, steam, or other vapor may be utilized to energize these operators. Additionally, such liquids under pressure as hydraulic fluid may be utilized. Accordingly, as used in this patent application, the terms "pressurized fluid" or "fluid under pressure" are intended to be construed to include compressed air, steam, or other pressurized gas or mixture of gases or vapor or pressurized water, hydraulic fluid or other liquid or mixture of liquids under pressure. In the majority of installations compressed air is the most convenient and practical pressurized fluid to be utilized.

It is also possible to energize the fluid-driven torsional operators which embody the present invention by mounting these operators in an environment having subatmospheric pressure and supplying the operator with input fluid at some pressure higher than that of the environment. Thus, the terms "pressurized fluid" or "fluid under pressure" are also to be construed to include circumstances where the operator is mounted in an environment having subatmospheric pressure, and the input fluid supplied to the operator is at a pressure higher than that of the environment. Thus, the input fluid is pressurized or under pressure relative to the pressure of the environment in which the operator is mounted.

2. Description of the Prior Art

A variety of rotary valve operator apparatus have been previously used to control rotary valves such as ball and butterfly valves. For example, Fisher Governor Company, predecessor to Fisher Controls Company, has marketed a pneumatically operated piston actuator, bearing the trademark "VEE-BALL", which operates on valve members through a piston crank linkage to convert linear motion into rotary motion. A scotch yoke and other mechanical linear-to-rotary motion converters have also been used in conjunction with various linear motion devices such as the pneumatic piston. In addition, electromagnetic and electromechanical operators are also known and used presently to turn rotary valves.

The prior art apparatus of the types reviewed above are generally complicated for providing rotary operation of the valves or other devices, because such prior art apparatus requires conversion of linear motion into rotary motion. In addition, the complex mechanical, electromechanical or electromagnetic operators in the prior art are themselves relatively expensive to manufacture.

The fluid-driven torsional operators which embody the present invention provide rotary motion in a unique and novel manner and they can be mounted so as to operate directly on the valve stem or other device to be turned.

Fluid-driven tension actuators are also presently known. For example, British patent specification No. 674,031 — Morin discloses a generally cylindrical-shaped diaphragm which includes a plurality of inextensible threads having an extensible deformable resilient sealing element bonded to and extending between the threads. When inflated, the resilient diaphragm changes shape causing changes in the curvature of the threads and hence moving the two rigid end parts towards or away from each other. U.S. Pat. No. 3,645,173 — Yarlott discloses a fluid actuator with an axially elongated thin-walled, flexible shell. A network of nonelastic strands is embedded in this flexible shell. Upon inflation, the shell radially expands but axially contracts. U.S. Pat. No. 3,638,536 — Kleinwachter et al. discloses a device having one or more diaphragms with inelastic filaments embedded in them to impart anistropic elasticity to the diaphragm. Anistropic elasticity may also be achieved by using secondary diaphragms that cannot be stretched by crimping or corrugating and embedding them in a flexible diaphragm. This device may then be used to convert fluid pressure into linear motion. In FIG. 7 of Kleinwachter et al. the diaphragm when inflated has the shape of a doughnut or toroid, generally resembling that of an inflated pneumatic tire, and the filaments extend obliquely across the radial direction between hub and rim, thereby producing torsion when inflated. However, because the Kleinwachter et al filaments extend in a near-radial direction, the angular motion is severely restricted.

SUMMARY OF THE INVENTION

In a preferred embodiment, the fluid-driven torsional operator of the present invention is well adapted for turning rotary valves, such as butterfly valves, ball valves, or the like, and for turning similar devices which swing about a pivot axis. For example, torsional operators embodying the present invention may be used to actuate circuit breakers, tilt mechanisms, dispensing mechanisms and control mechanisms. The torsional operator includes an inflatable, fluid-driven torsional actuator having an axially elongated, flexible hollow, thin-walled elastic shell which defines a fluid chamber and is formed with axially opposed ends. A number of inextensible flexible strands are bonded to the thin-walled shell and extend between the shell ends. Axially opposed coupling members are attached in fluid-tight sealing engagement to the opposite ends of the flexible shell, and the inextensible strands are anchored to these axially opposed coupling members. At least one of these coupling members is provided with a port through it to permit introduction of pressurized fluid into the fluid chamber to inflate the actuator and to permit discharge of fluid from the chamber as the actuator is being deflated.

When this torsional actuator is deflated, its flexible shell and the strands bonded thereto are helically twisted or coiled through a predetermined initial angle.

When the fluid chamber within the shell is inflated, the shell expands, causing the strands to bow outwardly along arcuate paths and the shell to uncoil, thereby producing torque and relatively rotating the axially opposed coupling members about the actuator axis for turning a valve or other device connected to the coupling members. The predetermined angle through which the shell and strands are initially twisted may be selected in accordance with the requirements of the mechanism being turned by the torsional operator embodying this invention. These torsional operators are particularly advantageous for providing rotary motion in the angular range from 0° up to 100°, and they can be used to provide a greater amount of angular movement, if desired.

A coil spring is mounted in encircling coaxial relationship about the fluid-driven torsional actuator. This coil spring has opposed ends each of which is respectively linked to one of the opposing coupling members. This coil spring functions to urge the inextensible strand elements and the shell to generally helically coil into their initial twisted position, thereby reversing the relative rotation of coupling members that is, to turn them back toward their starting position, when the actuator is deflated.

The fluid-driven torsional actuator and coil spring assembly are mounted in a rigid cylindrical housing which has upper and lower axially spaced mounting means. One of the actuator coupling members is fixed to the upper mounting means and the other coupling member is mounted for rotation in a thrust bearing which is carried in the lower mounting means. This rigid housing, then, functions to hold these coupling members and to establish the axial distance between them.

The coupling member mounted for rotation in the thrust bearing may be provided with a suitable connector to connect the operator to a valve or other device.

When the fluid-driven torsional actuator is inflated, the inextensible strands and the shell tend to uncoil overcoming the urging of the coaxially mounted coil spring to relatively rotate the attached opposed coupling members about the actuator axis. This rotation can be directly applied to turn the valve or other device to which the operator is connected. Upon actuator deflation, the coaxially mounted coil spring urges the inextensible strands and the shell to twist back, i.e., to rewind into the initial generally helically coiled configuration, thereby to reverse the relative rotation of the opposed coupling members. The rigid housing prevents axial contraction of the actuator in order to cause the generation of the torque about the actuator axis during inflation. The torque which results during actuator inflation acts in opposition to and overcomes the rewind torque of the coaxially mounted coil spring.

The fluid-driven torsional operators which embody the present invention exhibit low hysteresis loss and correspondingly high efficiency in converting fluid energy into mechanical work. These torsional operators are also capable of high frequency operation and exhibit extremely long operating lives. Accordingly, it is an object of the present invention to provide a unique and novel fluid-driven torsional operator advantageously usable for turning various devices which swing about a pivot axis.

Other objects, aspects, and advantages of the present invention will be pointed out in, or will become understood from, a consideration of the detailed description provided below in conjunction with the accompanying drawings.

BRIEF DESCRIPTION OF THE DRAWINGS

FIG. 3 is a side-elevational view of a second embodiment, which is presently preferred, of the fluid-driven torsional operator of the present invention shown partly in section. This fluid-driven torsional actuator is also shown in its initial deflated condition with its inextensible strands and shell generally helically coiled;

FIG. 4 is a view similar to that shown in FIG. 3 illustrating the fluid-driven torsional actuator in its inflated condition. The shell and inextensible strands are shown in their uncoiled condition, thereby having produced rotation of the lower coupling member;

FIG. 7 is a graphical illustration of a typical double-acting alternative embodiment of the fluid-driven torsional operator of the present invention;

DESCRIPTION OF THE PREFERRED EMBODIMENTS

Figure 1:
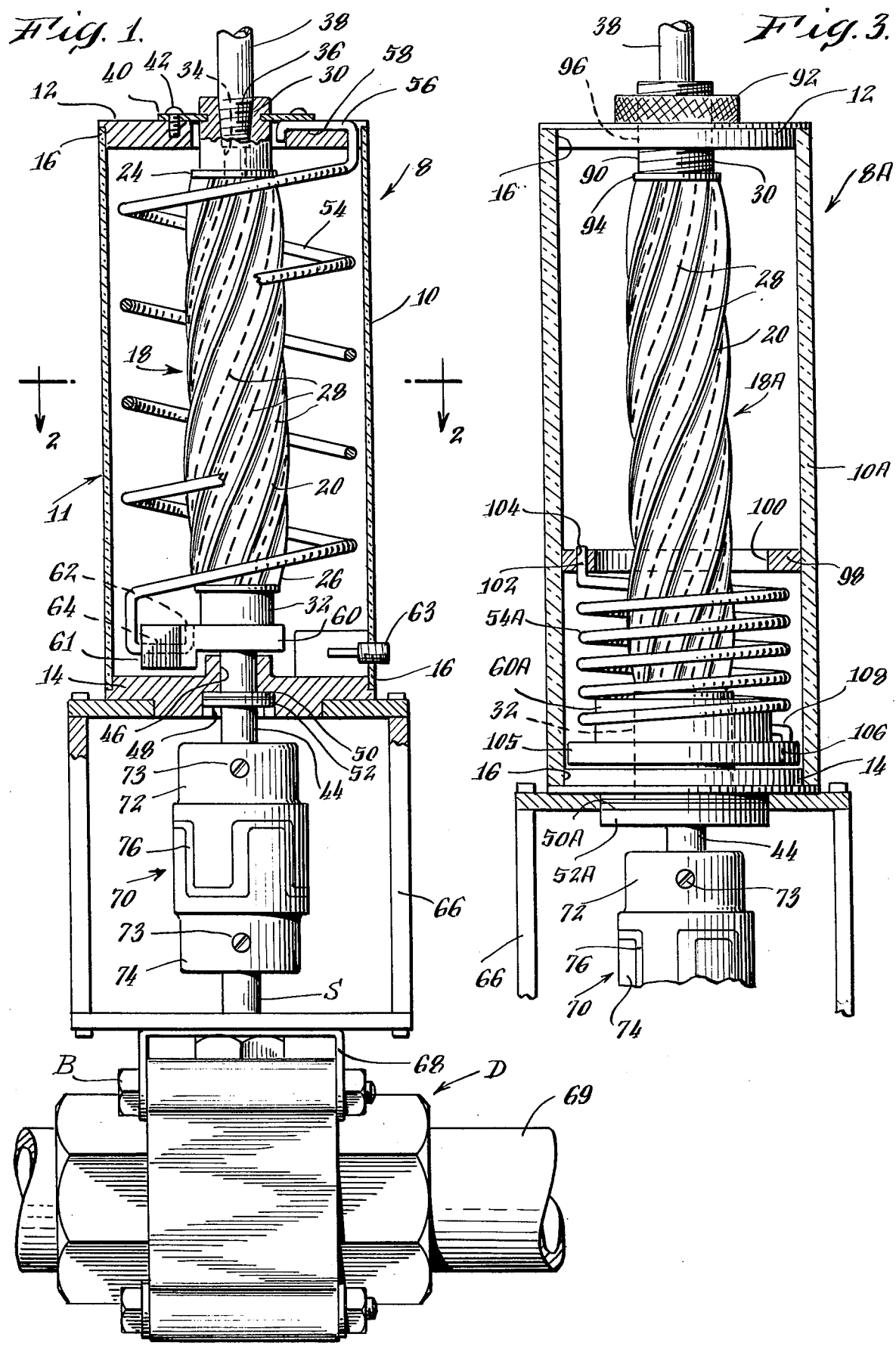
FIG. 1 is a side-elevational view of an embodiment of the fluid-driven torsional operator of the present invention shown partly in section with the coaxially-mounted coil spring shown partly broken away for clarity of illustration. The fluid-driven torsional actuator is shown in its initial deflated condition with the inextensible strands generally helically coiled together with the flexible thin-walled shell. Further, as an example of its useful application, the fluid-driven torsional operator is shown mounted for operation of a ball valve.

As shown in FIG. 1, the fluid-driven torsional operator 8 constructed in accordance with the present invention comprises a rigid housing 11 which includes a cylindrical frame 10 having upper and lower cap plates 12 and 14 respectively. Each cap plate may be provided with an annular rabbet 16 for accepting opposite ends of the cylindrical frame 10. In this manner, the frame fixes the axial spacing of the upper and lower cap plates, which serve as mounting means for the end coupling members, as will be explained further below.

Figure 2:
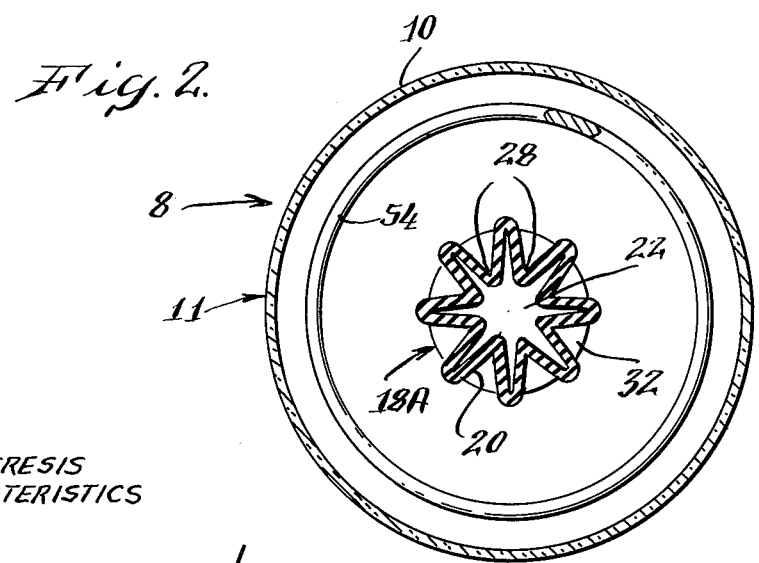
FIG. 2 is a cross-sectional view of this fluid-driven torsional operator taken through plane 2—2 looking downward which illustrates the fluid-chamber defined by the hollow thin-walled flexible shell in its deflated condition.

A fluid-driven torsional actuator 18 is coaxially mounted within the cylindrical frame. As shown in FIGS. 1 and 2, this fluid-driven torsional actuator comprises a hollow, thin-walled, axially elongated, flexible elastic shell 20 which defines a fluid chamber 22 (FIG. 2). This flexible shell is constructed from an elastomeric material, for example, reinforced synthetic rubber such as neoprene or nitril. Other elastomeric materials, such as viton or other high-temperature elastomers, may also be used if the actuator is intended for use in a high-temperature environment or with high-temperature pressurized fluid. This flexible shell is formed with upper and lower opposing ends 24 and 26 respectively and is reinforced by a series of flexible inextensible strands 28 which serve to resist elastic expansion and extend between these upper and lower shell ends. Flexible and relatively inextensible materials which have been found suitable for these inextensible strands include Dacron, Fiber-B and Nylon plastic material. These relatively inextensible strands 28 are embedded in and are bonded to the shell 20. This torsional actuator 18 or 18A may be constructed similar to the tension actuator shown in the Yarlott U.S. Pat. No. 3,645,173 with a shell having a generally prolate spheroidal form, except that in the torsional operators embodying the present invention, the actuator is mounted entirely differently from what is shown in said patent and is utilized in a manner entirely differently from what is shown in that patent.

The elastic shell 20 is shown in FIGS. 1 and 2 in its initial deflated condition with shell 20 and the inextensible strands 28 are generally helically coiled about the axis of the actuator 18. When helically twisted in this initial position, the hollow shell assumes a fluted configuration, as seen in FIG. 2, with a series of circumferentially spaced ridges and valleys which follow a generally helical configuration with the strands 28 extending along the valleys as shown dashed in FIG. 1. There are eight of these ridges and valleys shown in this example. Their number depends upon the number of inextensible strands 28 which are bonded to the shell 20. For example, there may be any number of such strands in the range from two to approximately two dozen, but in most applications, an intermediate number within this range will be found to operate to advantage.

The fluid-driven torsional actuator of the present invention as illustrated in FIGS. 1 and 2 further includes upper and lower coupling members 30 and 32 respectively which are attached to opposite ends of this actuator shell 20 in fluid-tight sealing engagement. Each coupling member 30 and 32 also has the opposite ends of each of the inextensible strands 28 anchored thereto. The upper coupling member 30 is provided with a fluid passage or port 34 which permits the introduction of pressurized fluid into the fluid chamber 22 defined by the flexible shell 20.

As shown in FIG. 1, this port may be provided with internal threads 36 for making connection to a fluid supply and control line 38. This line 38 may be connected to a suitable fluid source such as a source of compressed gas or pressurized liquid associated with control means for feeding pressurized fluid through the line 38 into the chamber 22 to inflate the shell 20 and for discharging fluid from this chamber for deflating the shell 20. The upper coupling member may also be provided with a welded mounting flange 40 which is adapted to be attached to the upper mounting means 12 by a number of screws 42. In this fashion, the upper coupling member 30 and hence the upper end 34 of the fluid-driven torsional actuator 18 are prevented from rotating relative to the cylindrical frame 10.

The lower coupling member 32 has an axially extending shaft 44 which is journaled in a bore 46 in the lower mounting means 14. This bore 46 is provided with an annular recess 48 in which is seated a thrust bearing 50. A thrust bearing race 52 is carried on the shaft 44 and engages the thrust bearing 50. This thrust bearing arrangement 50, 52 permits the lower coupling member 32 to rotate relative to the cylindrical frame. Additionally, the fixed mounting of the upper coupling member 30 and the rotatable thrust resisting mounting arrangement of the lower coupling member 32 establishes the axial distance between the upper and lower coupling members of the fluid-driven torsional actuator 18.

A coil spring 54 is mounted in the cylindrical frame 10 in encircling, coaxial relation to the fluid-driven torsional actuator 18. The upper end of this spring has a hook 56 which engages in a channel 58 machined in the upper mounting means 12. In this manner, the upper end of the spring is fixedly linked through the upper mounting means 12, the screws 42, and the flange 40 to the upper coupling member 30.

A collar 60 is secured to the shaft 44, and the lower end of the spring 54 is provided with a hook 62 which engages a channel 64 machined in this collar. In this manner, the lower end of the spring is linked to the lower coupling member 32 so as to turn therewith.

The coil spring 54 functions to urge (and to return) the fluid-driven torsional actuator 18 into its initial, generally helically twisted position shown in FIG. 1.

The collar 60 may be provided with a stop tab 61. A stop screw 63 is tapped into the cylindrical frame 10 and is positioned to be butted by the stop tab 61 to limit the extent of rotary movement of the lower coupling member 32. The screw may be tapped at different circumferential positions into the cylindrical frame 10 to provide an adjustable stop limit or other adjustable stop arrangements may be employed. For example, a stop may be attached onto the inner surface of the end mounting means 14 and may be adjusted into different angular positions about the axis of the shaft 44 for determining the extent of turning movement of the lower coupling member 32.

The cylindrical frame with its upper and lower mounting means 12 and 14 form an assembly which is mounted on a yoke box 66 which in turn is mounted on the valve or other device "D" which the fluid-driven torsional operator is intended to control. As shown in FIG. 1, the yoke box 66 may be provided with an inverted U-shaped bracket 68 which can be mounted directly on that device D using its assembly bolts B. As shown in FIG. 1, the device D is a ball valve in a pipe line 69. This valve is coupled to the fluid-driven torsional operator by means of a yoke 70 having driving and driven portions 72 and 74. The driving yoke portion 72 is fixed as by a key and set screw 73 to the shaft 44 for rotation with it. The driven yoke portion 74 is similarly fixed to the rotatable shaft S of the device being controlled. A rubber shock-absorbing spacer 76 is interposed between the driving and driven yoke portions to accommodate any slight misalignment between the shafts 44 and S.

Referring now to FIGS. 3 and 4, a preferred embodiment of the fluid-driven torsional operator 8A of the present invention is illustrated. In the operator 8A parts and elements performing functions corresponding with those of similar parts and elements in the operator 8 are referred to by corresponding reference numbers. This operator 8A includes a fluid-driven torsional actuator 18A which has structural features similar to those in FIG. 1 including the shell 20 and the strands 28 with upper and lower coupling members 30 and 32. This torsional actuator 18A is somewhat longer than the one shown in FIG. 1, and it is mounted in a housing 11A which includes a cylindrical frame 10A having upper and lower end cap plates 12 and 14 respectively, serving as mounting means for the actuator 18A.

The upper coupling member 30 illustrated in this embodiment differs slightly from that illustrated in FIG. 1 since it is provided with external threads 90 which mate with a knurled, threaded connector collar 92. This upper coupling member 30 has a flange 94 on its lower margin and is inserted through a hole 96 in the upper mounting means 12. The knurled collar 92 is screwed down onto the threads 90 to secure the coupling member 30 to the upper cap plate 12. As shown in FIG. 3, the flange 94 of the coupling member 30 is not yet drawn tightly to the upper cap plate.

The embodiment of the present invention illustrated in FIGS. 3 and 4 further differs from that illustrated in FIGS. 1 and 2 in the manner in which the coil spring 54A is mounted. An anchoring ring 98 is mounted in the frame 10A at approximately one-third of the height of this frame. This ring has a large aperture 100 to accommodate the fluid-driven torsional actuator 18A in inflated condition. The helical coil spring 54A has a relatively shorter height than the spring 54 shown in FIG. 1. The upper end of this spring 54A is provided with an upwardly extending finger or hook 102 which is accepted by a suitable channel 104 drilled in the anchor ring 98. Thus, the upper end of the spring 54A is fixed to the cylindrical frame 10A and through the upper mounting means 12 to the upper coupling member 30 thereby being fixedly linked to this coupling member. If desired, the anchor ring 98 may be provided with a series of the channels 104 located at different angular positions about the axis of the actuator so that the return torque to be exerted by the spring 54A can be adjusted by inserting its hook end 102 into different channels 104.

A collar 60A is mounted on the lower coupling member 32 for rotation therewith. This collar is provided with a radially extending flange 105 which has a second channel 106 drilled in it. The lower end of the spring 54A has a downwardly extending finger or hook 108 which engages this channel 106. Thus, the lower end of the spring is linked through the flange 105 and collar 60A to the lower coupling member 32 for rotation with it. This coil spring 54A funcations as does that illustrated in FIGS. 1 and 2 to urge the fluid-driven torsional actuator 18A into its initial twisted configuration with the inextensible strand 28 and the shell 20 generally helically coiled.

The lower coupling member 32 has a shaft 44 which carries a thrust-bearing race 52A. A thrust bearing 50A is mounted on the lower cap plate 14. In this manner, the lower coupling member 32 and shaft 44 are permitted to freely rotate with respect to the assembly of the cylindrical frame 10A and upper and lower cap plates 12 and 14.

Again, the cylindrical frame 10A, upper and lower mounting means 12 and 14 and the thrust-bearing assembly function to establish the axial distance between the upper and lower coupling members 30 and 32.

This second embodiment also includes a yoke box 66, shown broken away, which may be adapted in a fashion similar to that shown in FIG. 1 for attachment to a valve or other device to be controlled.

The operation of the fluid-driven torsional operators of the present invention will be explained with reference to FIGS. 3 and 4. FIG. 3 illustrates the fluid-driven torsional actuator 18A in its deflated condition, and FIG. 4 illustrates this actuator in its inflated condition with the elastomeric shell 20 bowed outwardly along an arc. When inflated, the flexible shell 20 expands forcing the strands 28 bonded thereto to bow outwardly along arcuate paths. Since these strands 28 are relatively inextensible, they do not significantly stretch; and as they are forced to bow outwardly, they are also forced to uncoil from their initial helically twisted pattern shown in FIG. 3 into a lesser twisted pattern as shown in FIG. 4. If the actuator were permitted to become fully inflated without opposition from the spring 54A, each strand 28 would deflect into a meridian arc on the fully inflated actuator shell.

In order to optimize the amount of driving torque obtained from the actuator 18 or 18A, the initial helical twist of the shell 20 and strands 28 is arranged to be sufficiently great that the strands do not become fully untwisted within the predetermined amount of angular travel desired to be produced. In other words, during inflation the strands 28 progressively deflect and untwist from an initial helical pattern toward a meridian arcuate pattern, but they do not fully reach the latter arcuate pattern.

Since these inextensible strands uncoil as the actuator is inflated, the ends of each respective strand 28 rotate about the actuator axis relative to each other. As shown in FIGS. 3 and 4, this rotation is in a clockwise direction as seen looking upwardly along the axis of the shaft 44. Because the cylindrical frame with its upper and lower mounting means 12 and 14 establishes the predetermined distance between the upper and lower coupling members 30 and 32, the fluid-energy utilized to inflate the actuator is converted into a rotational movement rather than into axially contractive movement.

Since the upper coupling member 30 is fixed to the upper mounting means 12, the lower coupling member 32 and its shaft 44 are caused to rotate relative to the housing 11.

The coil spring 54A functions to return the actuator to its initial twisted condition upon deflation as shown in FIG. 3. Further, if the operator is arranged to open the valve or other device D upon inflation, then the spring force provided by the coil spring tends to close that device upon deflation of the actuator. If desired, the operator may be arranged so that the converse is true, namely, so that inflation closes the valve or other device, and the spring force opens it upon deflation of the actuator.

In summary, when fluid under pressure is introduced into the actuator, it untwists to a greater or lesser extent, depending upon the amount of turning movement desired, and as it untwists the actuator overcomes the opposing torque of the coil spring.

Advantageously, the helical convolutions of the spring 54 or 54A are arranged to be coiled in the same direction, i.e. in the same sense, as the initial helical twisting of the actuator 18 or 18A. Therefore, upon inflation as the actuator untwists, the spring also untwists, thereby somewhat enlarging the diameter of the spring coils so as to provide additional clearance space within the spring into which the actuator can expand. This relationship means that a somewhat smaller diameter spring and housing can be used than if the spring were arranged in the opposite sense from the actuator.

Figure 5:
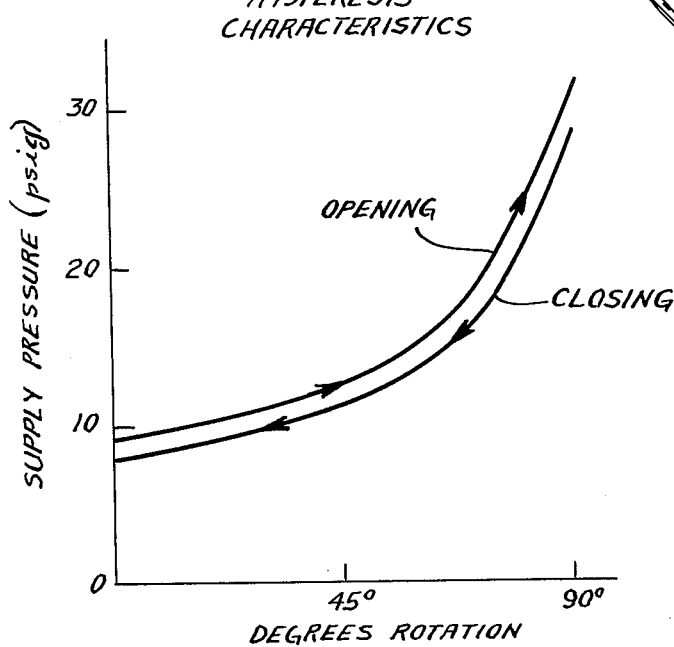
FIG. 5 is a graphical illustration of typical hysteresis characteristic of the preferred embodiment of the fluid-driven torsional operator of the present invention.

It has been found that fluid-driven torsional operators embodying the invention described above exhibit low hysteresis loss and correspondingly are capable of high efficiency in converting fluid energy to mechanical work. Typical hysteresis characteristics are illustrated in FIG. 5, which represents a hysteresis loss of about 5 percent of the mechanical energy being supplied by the pressurized fluid. In many cases lower levels of hysteresis loss can be obtained.

Figure 6:
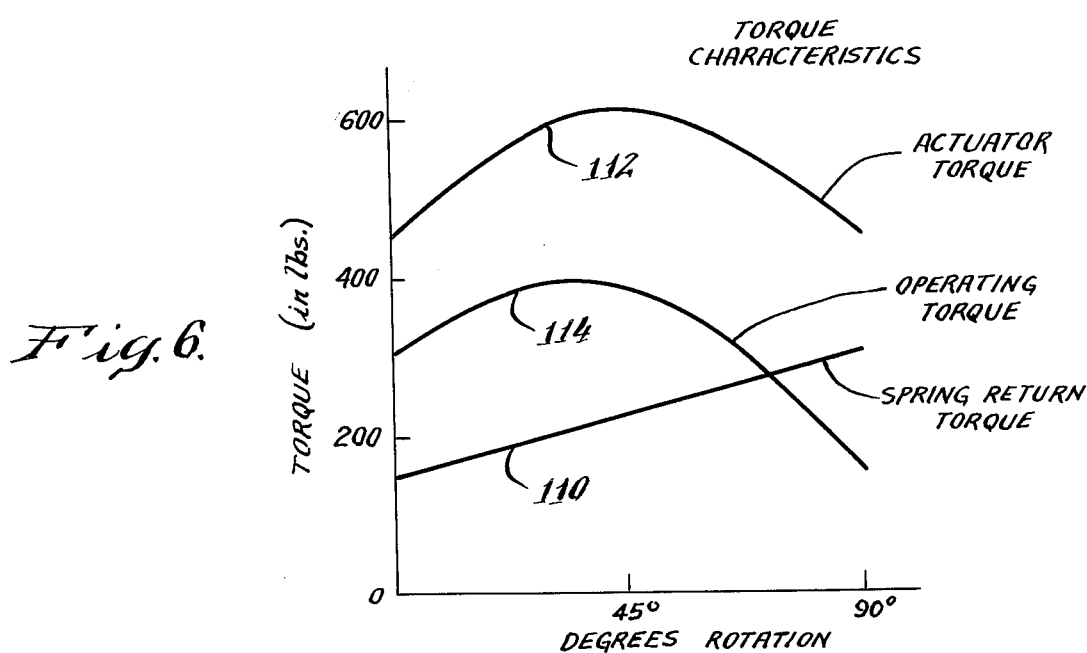
FIG. 6 is a graphical illustration of typical torque characteristics of the preferred embodiment of the fluid-driven torsional operator of the present invention.

Typical torque characteristics of this torsional operator are illustrated in FIG. 6. The relationship between degrees of rotation and torque in inch-pounds provided by the coil spring is linear in accordance with Hooke's Law. Thus, the spring return torque is plotted as an upwardly inclined straight line 110. The actuator torque is also indicated by the arched curve 112, showing that the actuator is initially twisted sufficiently far that the maximum torque to be exerted occurs at approximately mid-stroke. The operating torque of the fluid-driven torsional operator as shown by the curve 114 is the algebraic difference between the actuator torque 112 and the opposing spring return torque 110.

It has been found that the fluid-driven torsional operators embodying the present invention are capable of high frequency operation up to 125 Hz. Further, the operating life of these actuators is found to be well in excess of 500,000 cycles under full stroke reversal conditions at pressure levels of 60 pounds per square inch gage (p.s.i.g.) and is believed to be approximately 20 million cycles at 90 p.s.i.g. maximum operating pressure and over 100 million cycles at 50 p.s.i.g. maximum operating pressure. Bursting pressures for the fluid-driven torsional actuator are over 200 pounds per square inch. The angular output can be adjusted to lie anywhere within the range from 0° up to 100°, and an even greater amount of turning movement can be obtained if desired. These operators are also capable of operation in temperatures ranging from −30° F up to 220° F.

The fluid-driven torsional operators which embody the present invention offer several advantages over prior art rotary valve operators. They are simple in construction and operation. The fluid-driven torsional actuator which these operators employ produces a direct rotational output, obviating the need for a crank, scotch yoke, or other mechanical linear-to-rotary connector as is necessary with many prior art operators. Because of this simplicity, the torsional operators which embody the present invention are inherently inexpensive to manufacture. The wide range of operating temperatures and pressures and the long operating life also is highly desirable. The actuator may be fabricated from the same fibers and elastomers which are presently used in diaphragms. The remaining components of these operators are composed of conventional mechanical parts for example such as a spring steel for the coil spring, and aluminum for the housing and coupling members with a steel output shaft.

The two torsional operators 8 and 8A are single acting in that inflation produces turning motion in one direction, and a return spring produces turning motion in the opposite direction. It is to be understood that the operators embodying the present invention can also be made double-acting. This double-acting operation is accomplished by positioning a pair of the actuators 18 or 18A in end-to-end relationship with their fixed coupling members 30 adjacent to each other. Thus, the movable coupling members 32 are located at the respective outer ends of the pair of actuators. These movable coupling members are linked, i.e. mechanically ganged, together by a bracket so that they turn simultaneously as a unit. The direction or sense of twist of the pair of actuators is arranged to be opposite, and their inlet ports are isolated from each other. Therefore, as one is inflated it moves to untwist while twisting the other, and vice versa, to thereby provide a double-acting rotational output. The rotational output can be taken from either of the movable coupling members which are located at the opposite ends of the ganged pair of actuators.

As used in the claims, the phrase "means for urging the rotatable coupling member to turn relative to the other coupling member to produce an initial generally twisted condition of said actuator" or similar phrase is intended to be interpreted broadly to include spring means such as the coil springs 54 or 54A and also to include a second torsional actuator which is mechanically ganged to the first one to produce a double-acting mode of operation as described in the paragraph above.

Such a representative double-acting configuration according to my invention is illustrated in FIG. 7. The fluid-driven torsional actuators 120 and 122 are linked by a common fixed coupling member 124. The movable coupling members 126 and 128, containing shaft ends 136 and 138, are joined by a yoke member 130 so as to all turn together as a unit relative to 124. The inlet ports 132 and 134 are internal to 124 and are isolated from each other. The torsional actuators 120 and 122 are fabricated and pretwisted so that fluid admitted to port 132 will cause rotation in one direction while fluid admitted to port 134 will cause the reverse rotation.

Such double-acting embodiments of my invention offer distinct advantages over conventional double-acting piston, vane, or diaphragm operators. For a wide range of lengths, diameters, and twist angles the double-acting configuration of FIG. 7 will have only slight axial movement. This highly desirable feature of my invention makes possible the simplification or elimination of the usual thrust and steady bearings, together with their requisite supporting structure 140 which has been shown in broken-line form to emphasize its superfluous character. The consequent reductions in weight and cost offer great advantages in many applications.

In order to increase the effectiveness of this feature of small axial travel, I have determined by calculation and by experiment that it is helpful to dimension and proportion the actuators so as to exploit the counterbalancing simultaneous effects of arctuate "bowing" and of "untwisting" of the inextensible, flexible, load-bearing strands. If one takes as design parameters for torsional actuators the ratio ($l$) of length-to-mid-diameter and the ratio ($d$) of end diameter-to-mid-diameter, I have established that corresponding sets of these two ratios ($l,d$) exist which minimize the axial travel and therefore also the unbalanced thrust as the actuator moves through its normal angular range. If pairs of so-matched actuators (say $l=1.0$, $d=0.5$) are then used in a double-acting embodiment, the bearings can be eliminated with negligible axial travel.

Figure 8:
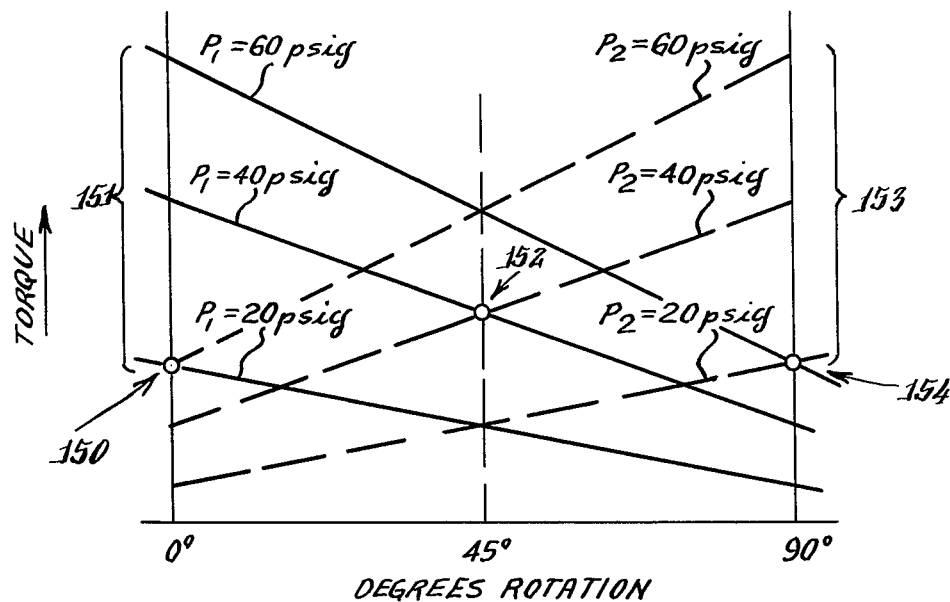
FIG. 8 is a plot of the torque-angle characteristics of the double acting embodiment when both actuators are pressurized.

A further highly advantageous feature of my invention in its double-acting embodiment follows from the nature of the operating characteristics depicted in FIG. 8. Referring to FIG. 7, if the ports 132 and 134 are simultaneously supplied with pressures $P_1$ and $P_2$ respectively, the actuators 120 and 122 will respectively produce the torque-angle families 151 and 153. In consequence of these characteristics the movable assembly will come to rest at an angular position which depends directly upon the two fluid supply pressures $P_1$ and $P_2$.

Figure 9:
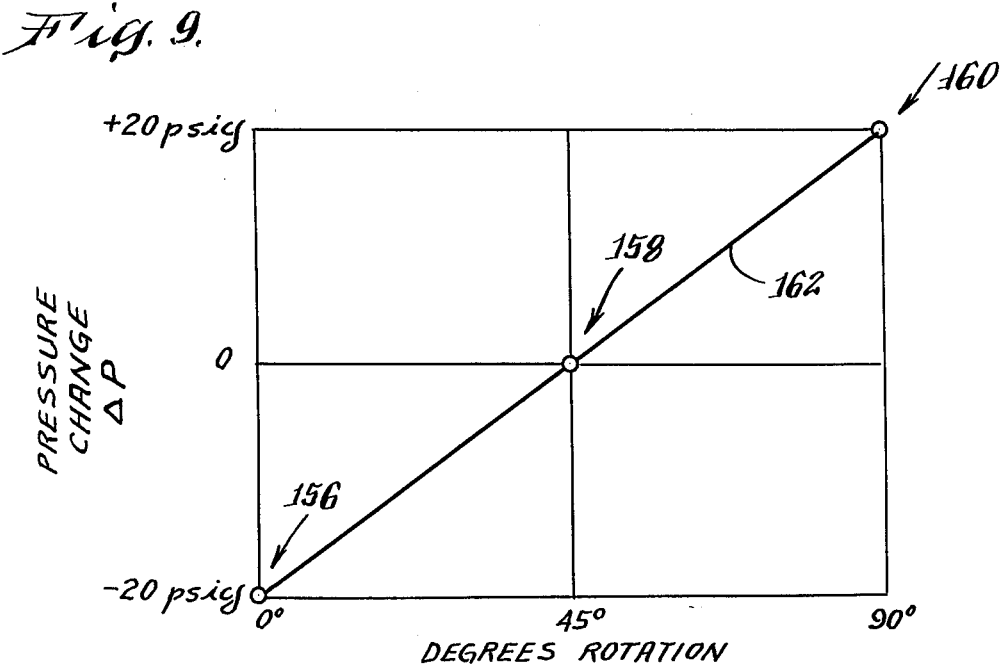
FIG. 9 is the resulting pressure angle plot of the double acting embodiment when the actuators are pressurized in push-pull fashion.

If the fluid supply is then arranged in "push-pull" fashion such that $P_1=P_o+\Delta P$ and $P_2=P_o-\Delta P$, the proportional characteristic 162 of FIG. 9 results. In particular, FIGS. 8 and 9 show experimental results for a double-acting torsional operator with $P_o$ set at 40 psig and ΔP limited to a range of 20 psig each side of $P_o$. The points 150, 152, 154 of FIG. 8 correspond respectively to points 156, 158, 160 of FIG. 9 and represent 0°, 45°, 90° respective angular motions along the operating characteristic 162.

This embodiment of my invention has the further advantage of providing uniform "stiffness" or "output impedance" at all angular positions, enabling the double-acting operator to maintain a stable position even for fluctuating torsional loads on the shaft stems 136 or 138 of FIG. 7. In contrast to this useful property of my invention, the double-acting piston, valve, or diaphragm operators currently in widespread use are not proportionally stable and will tend to move immediately to their extreme positions whenever the pressures corresponding to $P_1$ and $P_2$ are unequal. Position controllers are therefore required with increased cost and complexity, to permit stable proportional operation of the previously available double-acting operators. However, my invention, as above detailed and disclosed, satisfies this great need for stable, simple open-loop double-acting fluid proportional positioning operators.

In yet another highly advantageous embodiment of my invention, one torsional actuator can be connected to the normally controlling pressure source, while the second actuator can be connected to an adjustable pressure source through an intermediary suitable-sized volume of such pressurized fluid. In this manner, my invention provides both fail-safe operation and also the very desirable feature of a remotely-controlled continuously adjustable "fluid spring", which allows the ready alteration of the operator characteristics.

Finally, while most of the applications indicated in the above disclosure have utilized only an approximate 90° rotation of the operator and the requisite torsional actuators, embodiments of my invention can be arranged to operate over angular ranges of 270° and more.

Although specific embodiments of the fluid-driven torsional operators of the present invention have been disclosed in detail above, it is to be understood that this is for the purpose of illustration, and should not be construed as limiting the scope of the invention since modifications may be made in the described structure by those skilled in the art in order to adapt these torsional operators to particular applications.

I claim:

1. A double-acting fluid-driven torsional operator adapted to turn through a predetermined angular operating range comprising;

a fixed frame;
first and second torsional actuators mounted on said frame;
said actuators each including:
first and second flexible, thin-walled elastomeric shells,
said first and second shells defining first and second fluid chambers therein, respectively,
said first and second shells each having first and second coupling members at the opposite ends thereof and being fastened in fluid-tight relationship with the opposite ends of the respective shell,
each of said shells having a longitudinal axis extending through the first and second coupling members at its opposite ends and having a plurality of inextensible, flexible load-bearing strands bonded thereto and extending between and interconnecting the first and second coupling members at opposite ends of the respective shell, and
each respective shell developing an outwardly bowing arcuate shape when fully inflated with said plurality of strands of each shell deflecting into outwardly bowing meridian arcs uniformly spaced about the axis of the shell when the respective shell is fully inflated;
the first coupling member of both of said actuators being fixed to said frame for preventing rotation of both of said first coupling members;
rotatable means interconnecting the second coupling members of both of said actuators for causing said second coupling members to turn simultaneously;
said first and second fluid chambers within the respective first and second shells being separate one from another;
said first and second actuators being pre-twisted in opposite senses with respect to said rotatable means so that fluid admitted into the first of said chambers will exert torque for causing rotation of said rotatable means in a first sense while fluid admitted into the second of said chambers will exert torgue for causing rotation of said rotatable means in the opposite sense;
when said operator is turned to a first limit of said predetermined angular operating range, said shell of said first actuator being twisted about its axis into a fluted configuration with a series of circumferentially spaced ridges and valleys with each strand being twisted about said axis and with the strands of said shell extending along said valleys;
when said operator is turned to a second limit of said predetermined angular operating range, said shell of said second actuator being twisted about its axis into a fluted configuration with a series of circumferentially spaced ridges and valleys with each strand being twisted about said axis and with the strands of said shell extending along said valleys;
means defining a first fluid port for feeding pressurized fluid at pressures $P_1$ into said first chamber for inflating said first shell for causing said first shell to untwist about its axis and to bow outwardly while partially untwisting the strands thereof,
thereby exerting first torque in a first sense on said rotatable means for angularly moving said rotatable means in said first sense,
means defining a second fluid port for feeding pressurized fluid at pressures $P_2$ into said second chamber for inflating said second shell for causing said second shell to untwist about its axis and to bow outwardly while partially untwisting the strands thereof,
thereby exerting second torque in a second sense on said rotatable means for angularly moving said rotatable means in a second sense,
by virtue of all of which:
 a. the angular position of said rotatable means is proportional to the difference between said pressures $P_1$ and $P_2$ throughout said angular operating range, and
 b. the angular position of said rotatable means is stable at any angular position throughout said angular operating range.

2. A double-acting fluid-driven torsional operator as claimed in claim 1, in which:

the ratio of the axial length of said shells to their mid diameter when fully inflated is approximately unity, and said shells have end diameters adjacent to said coupling members which are approximately one-half of their mid diameter when fully inflated, thereby counter-balancing the simultaneous effects of arcuate bowing and untwisting of the respective inextensible load-bearing strands for causing their axially projected length to remain essentially constant as the shells of said actuators expand and untwist, thereby minimizing any tendency for said actuators to change their lengths during operation over said predetermined angular operating range.

3. A double-acting fluid-driven torsional operator as claimed in claim 1, in which:

first fluid feeding means are connected to said first port;

second fluid feeding means are connected to said second port, said first and second fluid feeding means being arranged to supply said pressurized fluid to said respective ports at said pressures $P_1$ and $P_2$ in push-pull fashion.

4. A double-acting fluid-driven torsional operator as claimed in claim 3, in which:

said pressures $P_1$ and $P_2$ in push-pull fashion follow the relationships:

$$P_1 = P_0 + \Delta P$$

$$P_2 = P_0 - \Delta P$$

where $P_0$ is a suitable pressure source of less than 90 pounds per square inch gage and $\Delta P$ is an increment and $-\Delta P$ is a corresponding decrement.

5. A double-acting fluid-driven torsional operator as claimed in claim 1, in which:

first fluid feeding means are connected to said first port;

second fluid feeding means are connected to said second port, said first fluid feeding means supplies said pressurized fluid at pressures $P_1$ as the normally controlling source of pressure; and said second fluid feeding means includes an adjustable source of pressures $P_2$ having a predetermined volume of pressurized fluid, whereby variation of said adjustable source of pressures $P_2$ provides remotely-controlled adjustability of the fluid spring characteristics of said double-acting operator, and whereby said predetermined volume of the pressurized fluid provides fail safe characteristics for said double-acting torsional operator.

* * * * *